June 12, 1945.　　T. H. WHALEY, JR　　2,378,116
METHOD AND APPARATUS FOR CONTROL OF VAPOR PRESSURE
Filed July 10, 1941
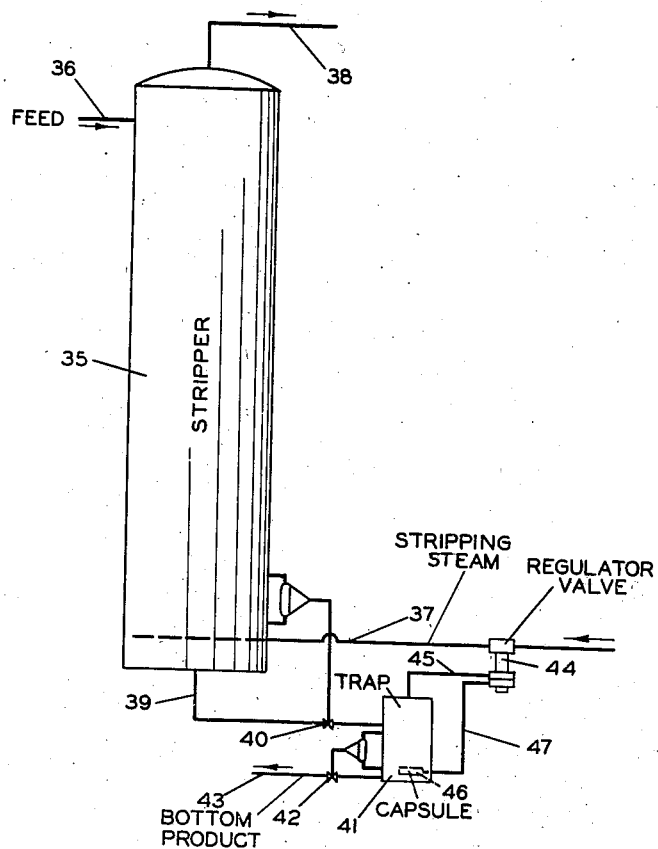
INVENTOR
THOMAS H. WHALEY JR.
BY
ATTORNEY Patented June 12, 1945

2,378,116

UNITED STATES PATENT OFFICE 2,378,116

METHOD AND APPARATUS FOR CONTROL OF VAPOR PRESSURE

Thomas H. Whaley, Jr., Bartlesville, Okla., assignor to Phillips Petroleum Company, a corporation of Delaware Application July 10, 1941, Serial No. 401,875

4 Claims. (Cl. 196—132)

The present invention relates to a method of and apparatus for treating fluid mixtures to produce a controlled vapor pressure product.

In the producing and marketing of petroleum products, the products or their intermediates often must be made to meet vapor pressure specifications. The products are usually a mixture comprising a plurality of components having a specified vapor pressure at a specified temperature. The vapor pressure specifications are often given in the terms of Reid vapor pressure or the vapor pressure of the liquid at 100° F. The vapor pressure of any given mixture depends upon the composition of the mixture and the temperature to which it is subjected.

The products are prepared to meet specifications by a unit operation, for example blending liquids of different volatility or by separating a "fraction" of the desired product from a more complex mixture. Apparatus for blending, blending devices, and apparatus for fractional separation, fractionators, have been devised for continuous operation. In use, fractionators and blending devices are controlled by various means to insure steady operation. Such apparatus is usually controlled by fixing the temperature, pressure, or temperature and pressure of operation. For example, a fractionating column is normally operated with a back pressure regulator on the run tank to maintain a constant pressure on the column, a definite feed rate, and definite reflux. The steam to the column is usually thermostatically controlled. A rectifying column with these controls will operate satisfactorily to give a constant vapor pressure top product under ideal conditions where no temperature changes take place in any part of the system and the composition of the feed remains constant. Changes in these variables require changes by the operator of other operating conditions to compensate for changes which are beyond his control.

Prior practice has been to control the quantity of steam to the column by a thermostatic control. Under ideal operating conditions with no fluctuations in pressure at the base of the column, a constant vapor pressure bottom product is obtained. Even with constant pressure in the column, the objection to temperature control is that if the feed composition changes, the volume of vapor in the column is subjected to considerable variation which seriously affects the efficiency of the column operation. If the column pressure does vary in operation, as it often does, the vapor pressure of the bottom product is subject to corresponding variations. Another method of controlling steam to the column is to place a rate of flow controller on the steam line. This assures a constant rate of vapor up the column but unless a proper control is used, the bottom product is subject to variations in vapor pressure.

The present invention provides improved apparatus and methods for controlling blending devices, fractionators, and similar equipment to insure production of a constant vapor pressure product. Control of the vapor pressure of the product under variable temperature and pressure conditions is by difference in the vapor pressure of the product or intermediate and the vapor pressure of a control liquid in heat exchange with the product or intermediate. One of the operating variables is changed to equalize the vapor pressures and produce a product of constant vapor pressure characteristics.

An object of this invention is to provide an improved method of controlling unit operations to yield a controlled vapor pressure product;

A further object of this invention is to provide regulating means for apparatus producing products of definite vapor pressure characteristics;

A still further object of this invention is to provide regulating means which will allow flexibility of the controlled apparatus under variable conditions of temperature, pressure, and feed composition.

The drawing is a diagrammatic elevation of a stripper or fractionating column in which the vapor pressure of the bottom product is controlled by control of stripping medium to the stripper, embodying my invention.

The drawing illustrates a method of controlling the vapor pressure of the bottom product from a fractionator of specific type known as a stripper by control of the flow of stripping medium in accordance with the present invention. The control is not affected by changes in operating pressure, operating temperature or feed composition and will operate to produce a bottom product having a definite vapor pressure as long as the capacity of the stripper is not exceeded. A stripper 35 which comprises a countercurrent contacting column is provided with a feed inlet 36 at its upper end. Stripping steam or stripping medium is introduced into the base of the stripper through the pipe 37. The vapors from the stripper leave the top of the column through the pipe 38. Bottom product stripped of the light or more volatile components is removed from the base of the column through the outlet pipe 39 in accordance with the action of the float control valve 40. The bottoms are passed to a trap 41 in which a constant level is maintained by the float control valve 42. The bottom product passing the valve 42 flows through the line 43 to storage. The regulator valve 44 is placed in the pipe 37 to control the flow of stripping medium. The vapor pressure of the bottom product is transmitted to the regulator valve through the pipe 45 from the top of the trap 41. Capsule 46 containing a control liquid corresponding to the composition of the desired bottom product is contained in the trap in heat exchange with the liquid bottom product. The vapor pressure of the control liquid in the capsule is transmitted to the regulator valve motor through the pipe 47. The pressure line 45 cannot be connected to the stripper since the stripper pressure is equivalent to the partial pressure of the hydrocarbons plus the partial pressure of the stripping medium, and the partial pressures are proportional to the concentrations of the components present. Therefore, the vapor pressure of the bottom product must be taken after it leaves the stripping column. This is the purpose of the trap 41, through which the bottom product flows. In operation the quantity of stripping steam supplied to the stripper is governed by the regulator valve and responds to differences between the vapor pressure of the bottom product and that of the desired bottom product contained in the capsule. For example, if the composition of the bottom product is such that the vapor pressure of the bottom product is greater than the vapor pressure of the sample or control liquid in the capsule, the differential in the pressures operates the regulator valve to supply more stripping medium to the base of the column, removing the undesirable light components, and bringing the vapor pressure of the bottom product back to normal. If the vapor pressure of the bottom product is too low the regulator valve operates to decrease the rate of flow of the stripping medium and allows more of the lighter components to enter the bottom product, thus raising the vapor pressure.

The control of the bottom product in the stripping column described relative to the drawing is not to be confined with the control of the rate of stripping steam only in accordance with the vapor pressure of the liquid in the trap. In the latter instance control of the vapor pressure of the bottom product can be effected only if the temperature of the liquid in the trap is maintained constant. In practice, the temperature of the bottom product is subject to variation. As the composition of the feed entering the top of the column changes, the quantity of steam required for stripping changes. Variations in the rate of stripping steam supplied to the stripper, and variations in the feed composition, result in temperature variations of the bottom product. The present control responds only to differences in the composition of the bottom product and makes compensating changes in an operating variable to control the composition of the bottom product.

While I have described an illustrative embodiment of the invention, it is obvious that changes may be made in the particular apparatus employed and that other methods embodying the same principle involved may be practiced without departing from my invention, the scope of which is defined only by the following claims.

I claim:

1. In a device for controlling the vapor pressure of the bottom product of a stripper, a regulator valve in the stream of stripping medium to the stripper, a receiver for substantially stripping medium-free bottom product from the stripper, a control liquid in heat exchange with the bottom product in said receiver, said control liquid having substantially the same vapor pressure characteristics as the desired bottom product, a differential pressure responsive motor associated with said regulator valve, means for transmitting the vapor pressure of the control liquid to said motor, means for transmitting the vapor pressure of the bottom product in said receiver in the absence of stripping medium to the motor, the motor operating on any differential between said vapor pressures to change the rate of flow of said stripping medium and thus equalize said vapor pressures.

2. In a process for fractionating liquids in which liquid to be fractionated is fed to a fractionating column, an overhead product is withdrawn from the top of the column, a bottom product is withdrawn from the base of the column, and vaporizing fluid in the form of stripping fluid is supplied to the column, the improvement comprising withdrawing the bottom product from the fractionating column substantially free from stripping fluid, placing a control liquid in indirect heat exchange relation with the withdrawn bottom product of the fractionation, said control liquid having substantially the same composition and vapor pressure as the desired bottom product, and supplying the stripping fluid to said column in accordance with the vapor pressure of the control liquid with reference to the vapor pressure of the bottom product in heat exchange therewith, any excess in the vapor pressure of the control liquid over that of said bottom product operating to decrease the supply of stripping fluid to the column and any deficiency in the vapor pressure of the control liquid operating to increase the supply of stripping fluid to the column.

3. In apparatus for fractionating liquids comprising a fractionating column provided with means for supplying to the column liquid to be fractionated, means for withdrawing an overhead product from the column, means for withdrawing a liquid bottom product from the column, and means for supplying vaporizing fluid to the column in the form of stripping medium, the improvement comprising valve means for controlling the supply of said stripping medium to the column, a receiver for bottom product from said column, means for operating said valve means comprising a container in said receiver and containing a control liquid in heat exchange relation with bottom product produced by said fractionation substantially free from stripping medium, said control liquid having substantially the same composition and vapor pressure as the liquid in heat exchange therewith, and means responsive to any difference between the vapor pressure of said control liquid and the vapor pressure of the liquid in said receiver in heat exchange therewith, for operating said valve means, any excess of the vapor pressure of the control liquid over that of the liquid in heat exchange therewith operating to decrease the supply of said stripping medium to the column, any deficiency of the vapor pressure of said control liquid operating to increase the supply of said stripping medium to the column.

4. In apparatus for fractionating liquids comprising a fractionating column provided with means for supplying to the column liquid to be fractionated, means for withdrawing overhead product from the column as vapor, means for withdrawing a liquid bottom product from the column, and means for supplying a vaporizing fluid in the form of a stripping medium to said column, the improvement comprising valve means for regulating the supply of said stripping medium, means for receiving bottom product from said column substantially free from stripping medium, a container containing a control liquid in heat exchange with said bottom product in said receiving means, actuating means responsive to pressure differences for operating said valve means, means for transmitting the vapor pressure of said bottom product in said receiving means to said actuating means, and means for transmitting the vapor pressure of the control liquid to said actuating means in opposition to the vapor pressure of the bottom product, any excess in the vapor pressure of said control liquid over that of the bottom product operating to decrease the supply of stripping medium to the column, any deficiency in the vapor pressure of the control liquid relative to that of the bottom product operating to increase the supply of stripping medium to the column.

THOMAS H. WHALEY, Jr.